United States Patent
Innes et al.

(10) Patent No.: US 9,926,847 B2
(45) Date of Patent: Mar. 27, 2018

(54) METHOD AND APPARATUS FOR ISOLATING INACTIVE FUEL PASSAGES

(71) Applicant: Rolls-Royce plc, London (GB)

(72) Inventors: Matthew C. Innes, North Lancaster (CA); Ian Whenham, Lachine (CA); Yann Courbariaux, Verdun (CA); Margaret Kathleen Bohan, Bedford (CA)

(73) Assignee: Rolls-Royce plc, London (GB)

( * ) Notice: Subject to any disclaimer, the term of this patent is extended or adjusted under 35 U.S.C. 154(b) by 270 days.

(21) Appl. No.: 14/688,595

(22) Filed: Apr. 16, 2015

(65) Prior Publication Data
US 2015/0219012 A1 Aug. 6, 2015

Related U.S. Application Data

(63) Continuation of application No. 13/936,071, filed on Jul. 5, 2013, now abandoned, which is a continuation
(Continued)

(51) Int. Cl.
*F02C 7/22* (2006.01)
*F23D 14/02* (2006.01)
(Continued)

(52) U.S. Cl.
CPC .............. *F02C 7/222* (2013.01); *B05B 7/02* (2013.01); *F02C 7/22* (2013.01); *F23D 11/38* (2013.01);
(Continued)

(58) Field of Classification Search
CPC .... F23R 3/28; F23R 3/43; F23R 3/286; F23R 3/36; F02C 1/00; F02C 7/22; F02C 7/222; F02C 7/236; F02C 7/2365; F23D 1/005; F23D 11/101; F23D 11/107; F23D 11/24; F23D 11/38; F23D 11/383; F23D 11/386; F23D 14/02; F23D 14/48; F23D 17/002; F23D 17/005; F23D 17/007; F23D 23/00
See application file for complete search history.

(56) References Cited

U.S. PATENT DOCUMENTS 2,907,527 A 10/1959 Cummings
2,933,894 A 4/1960 Johnson et al.
(Continued)

FOREIGN PATENT DOCUMENTS

EP 0627596 A1 12/1994
EP 0660038 A2 6/1995

OTHER PUBLICATIONS

European Patent Office Search Report, Application No. 11826203.9-1602, dated Aug. 4, 2016. (5 pages).
(Continued)

*Primary Examiner* — Arun Goyal
(74) *Attorney, Agent, or Firm* — Barnes & Thornburg LLP

(57) ABSTRACT

A system includes a turbine engine having a fuel injector. The fuel injector includes fluid ducts, each having a fuel inlet coupled to a distinct fuel source. The system includes a compressed air source that provides compressed air simultaneously to the fluid ducts, and a convergence point where combined fuel and air streams from the ducts are mixed. The fuel inlets are in a parallel flow arrangement such that no fuel from one fuel injector is present at another fuel injector.

11 Claims, 3 Drawing Sheets

Related U.S. Application Data of application No. PCT/IB2011/003329, filed on Dec. 30, 2011.

(60) Provisional application No. 61/428,744, filed on Dec. 30, 2010.

(51) Int. Cl.
  *F23D 11/38* (2006.01)
  *F23D 17/00* (2006.01)
  *F23R 3/30* (2006.01)
  *F23R 3/36* (2006.01)
  *B05B 7/02* (2006.01)

(52) U.S. Cl.
  CPC ........... *F23D 14/02* (2013.01); *F23D 17/002* (2013.01); *F23R 3/30* (2013.01); *F23R 3/36* (2013.01)

(56) References Cited

U.S. PATENT DOCUMENTS

| | | | |
|---|---|---|---|
| 3,285,007 A | 11/1966 | Carlisle et al. |
| 3,777,983 A | 12/1973 | Hibbins |
| 3,866,413 A | 2/1975 | Sturgess |
| 4,327,547 A | 5/1982 | Hughes et al. |
| 4,362,022 A | 12/1982 | Faucher et al. |
| 4,463,568 A | 8/1984 | Willis et al. |
| 4,713,938 A | 12/1987 | Willis |
| 5,243,816 A | 9/1993 | Huddas |
| 5,277,023 A | 1/1994 | Bradley et al. |
| 5,359,847 A | 11/1994 | Pillsbury et al. |
| 5,386,941 A | 2/1995 | Haynes |
| 5,451,160 A | 9/1995 | Becker |
| 5,615,555 A | 4/1997 | Mina |
| 5,647,538 A | 7/1997 | Richardson |
| 5,701,732 A | 12/1997 | Nesbitt et al. |
| 6,070,411 A | 6/2000 | Iwai et al. |
| 6,145,294 A | 11/2000 | Traver et al. |
| 6,161,387 A | 12/2000 | Green |
| 6,345,505 B1 | 2/2002 | Green |
| 6,418,726 B1 | 7/2002 | Foust et al. |
| 6,609,380 B2 | 8/2003 | Mick et al. |
| 6,915,636 B2 | 7/2005 | Stuttaford et al. |
| 7,104,070 B2 | 9/2006 | Iasillo et al. |
| 8,465,276 B2 | 6/2013 | Prade |
| 2003/0106320 A1 | 6/2003 | Ryan |
| 2009/0061365 A1 | 3/2009 | Prade |
| 2009/0165435 A1 | 7/2009 | Koranek |

OTHER PUBLICATIONS

International Search Report and Written Opinion, PCT/IB2011/003329, Rolls-Royce Power Engineering plc, dated Jun. 27, 2012.
Canadian Office Action, Canadian Application No. 2833205, dated Oct. 25, 2017, 3 pages.

US 9,926,847 B2

METHOD AND APPARATUS FOR ISOLATING INACTIVE FUEL PASSAGES

RELATED APPLICATIONS

The present application is a continuation of U.S. patent application Ser. No. 13/936,071, filed Jul. 5, 2013, which is a continuation application of International Application No. PCT/IB2011/003329, filed Dec. 30, 2011, which claims the benefit of U.S. Provisional Patent Application No. 61/428,744 filed Dec. 30, 2010, each of which are incorporated herein by reference.

BACKGROUND

The technical field generally but not exclusively relates to fluid injection or spraying, and more particularly relates to fluid injection such as fuel injection where some fluid passages are inactive in some modes of operation. Inactive fluid passage(s) may be found in equipment for many reasons including, but not limited to: a pilot injector which is utilized for low power operation and may be turned off as required at higher power; staged fuel injector(s) which may be turned on and off based upon desired operating parameters or for emissions considerations; fuel injectors utilized for operation on different types of fuel either simultaneously or alternatively; and adding or switching between chemicals for a sprayer or cleaning nozzle. During times that a fluid passage is inactive, hot combustion products, fuel, or other injected chemicals can enter the inactive passages. Also, an inoperative fluid passage may have stagnant residual fluid that, if exposed to temperature, chemicals, or other contaminants may be altered, solidify, or cause corrosion. Further developments are desirable in this area.

SUMMARY

One embodiment includes a fluid injector that selectively provides injection of a first active fluid or a second active fluid, where the injection ducts of the active fluids are not exposed to other active fluids in the injector or to products of the mixed active fluids. Further embodiments, forms, objects, features, advantages, aspects, and benefits shall become apparent from the following descriptions, drawings, and claims.

DESCRIPTION OF THE ILLUSTRATIVE EMBODIMENTS

Figure 1:
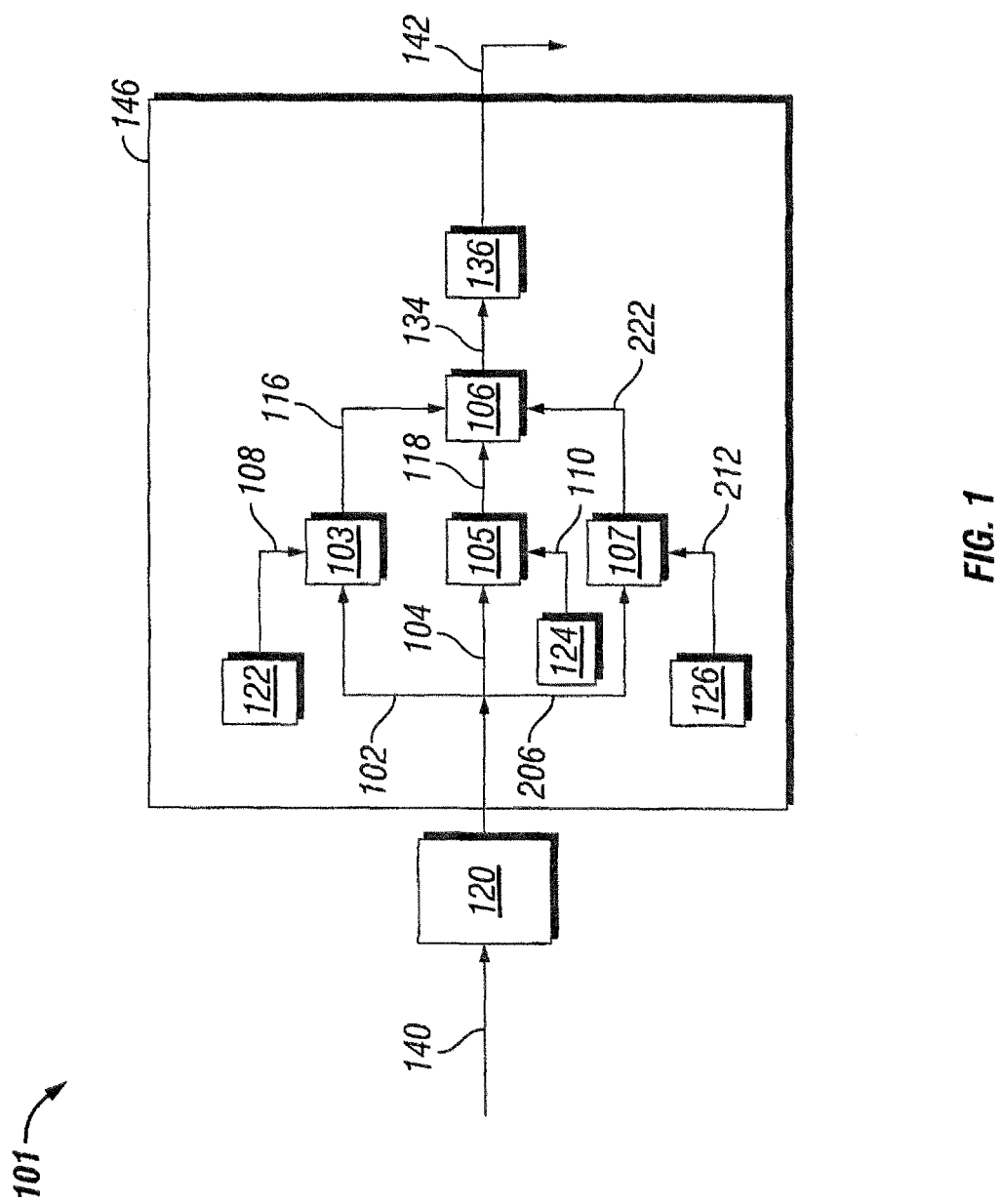
FIG. 1 is a schematic block diagram of a system for isolating inactive fluid passages.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated and protected.

FIG. 1 is a schematic block diagram of a system 101 for isolating inactive fluid passages. The exemplary system 101 is a gas turbine engine having a fuel injector 146, although other types of systems are contemplated herein. Non-limiting examples of system types include a paint spray nozzle, a chemical sprayer, a cleaning device, and/or any other type of fluid injector. The fuel injector 146 includes a number of fluid ducts 103, 105, 107, each associated with a distinct active fluid source 122, 124, 126, which are fluidly coupled to the ducts 103, 105, 107 via corresponding active fluid inlets 108, 110, 212. The fuel injector 146 is illustrated with three fluid ducts 103, 105, 107, but may include two fluid ducts or more than three fluid ducts. The active fluid sources 122, 124, 126 may provide distinct fuels (e.g. jet fuel, natural gas, diesel, a bio-fuel, hydrogen, etc.), fuel additives, inert fluids, or other fluids understood in the art.

The fuel injector 146 receives a carrier fluid from a compressed fluid source such as a compressor 120 providing compressed air. The compressor 120 receives an inlet stream 140 of the carrier fluid. A carrier fluid stream 102, 104, 206 is provided to each fluid duct 103, 105, 107. The compressor 120 may be a compressor or compressor stage normally found on the gas turbine engine where the carrier fluid streams 102, 104, 206 are bleed-off streams from the compressor, or the compressor 120 may be an auxiliary or dedicated compressor for the fluid injector 146 and/or auxiliary devices. In certain embodiments, the carrier fluid streams 102, 104, 206 may be provided by more than one compressor 120 or pressurizing device, or they may be divided from a single pressurized stream as illustrated in FIG. 1.

The fuel injector 146 includes a convergence point 106 that receives combined streams 116, 118, 222 from each of the fluid ducts 103, 105, 107. Each combined stream 116, 118, 222 includes a carrier fluid stream 102, 104, 206 combined with active fluid from the associated fluid inlet 108, 110, 212. Each combined stream 116, 118, 222 includes primarily carrier fluid during times when the associated active fluid source 122, 124, 126 is not delivering active fluid, and is combined carrier fluid with the associated active fluid during times when the associated active fluid source 122, 124, 126 is delivering active fluid. Within each combined stream 116, 118, 222 at positions downstream of the associated active fluid inlets 108, 110, 212, the combined stream 116, 118, 222 may contain amounts of localized reverse flow fluids. The localized reverse flow may have any cause. Exemplary, non-limiting localized reverse flows include flow due to pressure differentials between combined streams 116, 118, 222, flow due to Coanda effects causing injected liquids to reverse slightly into neighboring fluid streams, and/or flow into active fluid inlets 108, 110, 212 that do not presently have flow from the corresponding active fluid source 122, 124, 126.

In certain embodiments, the effluent 134 of the convergence point 106 may be provided to a nozzle 136 or other device of the injector 146. The output 142 of the injector 146 may be provided to a combustion chamber (not shown) or otherwise utilized in the system 101.

In certain embodiments, the active fluid inlets 108, 110, 212 are structured in a parallel flow arrangement. A parallel flow arrangement indicates that each active fluid inlet 108, 110, 212 is positioned at a flow location upstream of any fluid mixing point between any of the active fluid inlets 108, 110, 212. In a further embodiment, the parallel flow arrangement further includes each active fluid inlet 108, 110, 212 is positioned at a flow location that is an additional distance upstream of any fluid mixing point between each of the plurality of fluid ducts 103, 105, 107 such that any localized flow reversal will not provide mixed fluid at any active fluid inlet 108, 110, 212. The localized flow reversal includes the Coanda effect flow, a fluid duct pressure differential flow, and/or an idle active fluid inlet 108, 110, 212 reverse flow.

The determination of the additional distance upstream may be made by testing the operating conditions of the fuel injector 146 (or other device). Exemplary determination conditions include, without limitation, maximum flow rates of adjacent fluid ducts 103, 105, 107 at times when an active fluid inlet 108, 110, 212 will be idle, maximum flow reversals that occur during times when the compressor 120 may be providing one or more carrier fluid streams 102, 104, 206 at a low pressure, and the extent of Coanda flow when an injected fluid is under conditions for maximal Coanda flow such as an elevated viscosity condition of fluid in the system.

Figure 2:
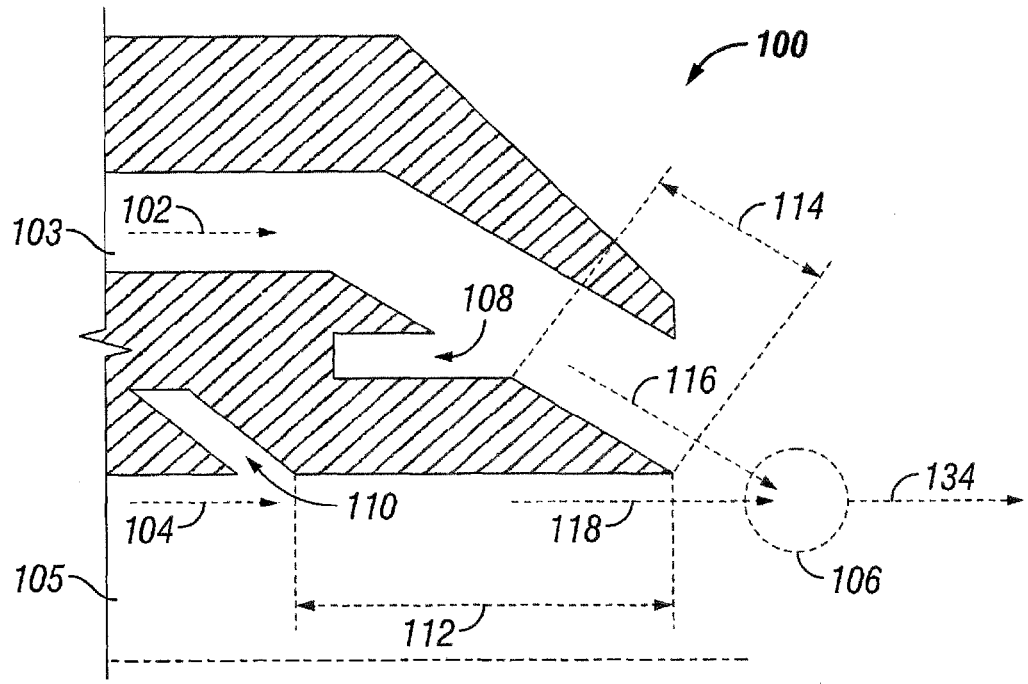
FIG. 2 is an illustrative view of an injector that isolates inactive fluid passages.

FIG. 2 is an illustrative view of an injector 100 that isolates idle active fluid passages 108, 110. The injector 100 is a cutaway view of one-half of the injector, with certain non-essential features omitted such as the extent of active fluid inlets 108, 110 upstream of the inlet openings into the fluid ducts 103, 105. The fluid injector 100 includes a first fluid duct 103 having a first active fluid inlet 108 and a second fluid duct 105 having a second active fluid inlet 110. A carrier fluid source provides a carrier fluid simultaneously into each of the first fluid duct 103 and the second fluid duct 105, the carrier fluid stream 102 into the first fluid duct 103 and the second carrier fluid stream 104 into the second fluid duct 105.

The injector 100 includes a convergence point 106 that receives a first combined stream 116 and a second combined stream 118. The first combined stream 116 includes the first carrier fluid stream 102 mixed with the first active fluid, and the second combined stream 118 includes the second carrier fluid 104 mixed with the second active fluid. The combined streams 116, 118 at certain operating conditions may be primarily carrier fluid when the associated active fluids are not being provided. The first active fluid inlet 108 and the second active fluid inlet 110 are structured in a parallel flow arrangement. The parallel flow arrangement includes each active fluid inlet 108, 110 fluidly coupled to the associated fluid duct 103, 105 at a position upstream of any mixing of the fluid flows in the fluid ducts 103, 105. In one embodiment, the first active fluid includes a first fuel and the second active fluid includes a second fuel. In certain embodiments, the active fluids include fuel, paint, primer, fluid chemical, solvent, and/or water. In certain embodiments, the first active fluid and the second active fluid may be the same fluid—for example allowing the first fluid source 122 to be refilled or recharged while the injector 100 continues operation by providing active fluid from the second fluid source 124.

In certain embodiments, the parallel flow arrangement further includes each active fluid inlet 108, 110 positioned at a flow location that is an additional distance upstream of any fluid mixing point such that any localized flow reversal will not provide mixed fluid at any active fluid inlet 108, 110. The localized flow reversal includes Coanda effect flow, fluid duct 103, 105 pressure differential flow, and/or reverse flow in an active fluid inlet 108, 110 due to an idle active fluid source 122, 124. Non-limiting examples of a carrier fluid 102, 104 include air, nitrogen, argon, an inert gas, and/or water. In the embodiment of FIG. 2, the first active fluid inlet 108 is provided at the distance 114 upstream of the nearest mixing point 106. The second active fluid inlet 110 is provided at the distance 112 upstream of the nearest mixing point 106.

The distance 112 and the distance 114 may be the same distance, or differential distances. Where the distances 112, 114 are different, the difference may be due to the estimated fluid flows and pressures of the streams in the most likely situations for the injector 100 to experience localized reverse flows (e.g. if the carrier fluid 102 has a higher maximum flow rate than the carrier fluid 104, the distance 112 may be greater than the distance 114 in response), and/or due to the expected Coanda flow into the respective fluid passages. In certain embodiments, the distances 112, 114 may be different due to manufacturing convenience of the injector 100, where each distance 112, 114 is provided at least equal to the expected distance to avoid active fluid reverse flow into one of the active fluid inlets 108, 110, but some distances 112, 114 may be provided at a greater distance than required.

Figure 3:
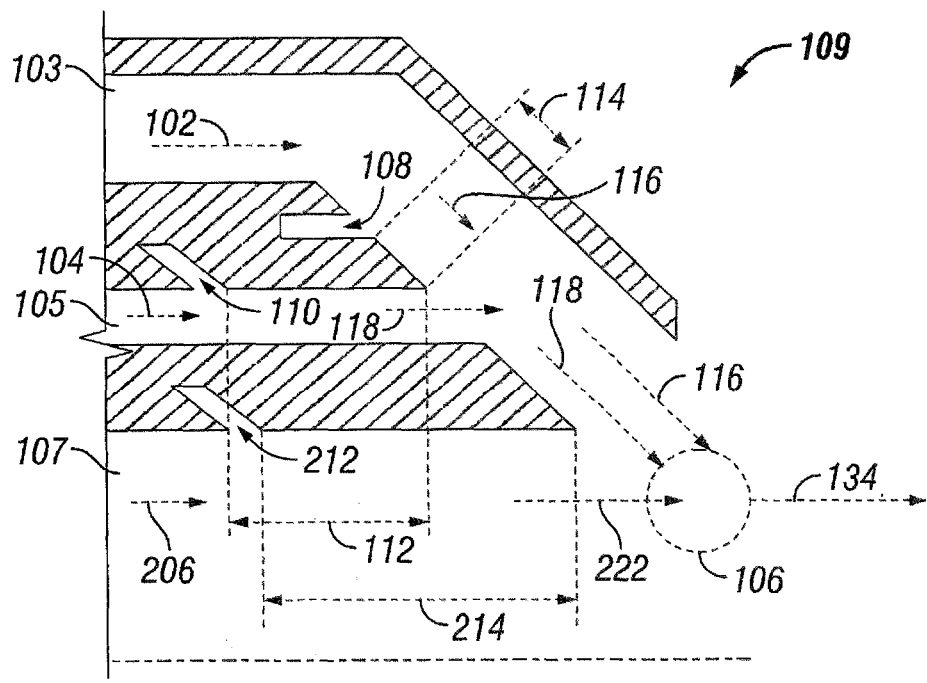
FIG. 3 is an illustrative view of an alternate embodiment of an injector that isolates inactive fluid passages.

FIG. 3 is an illustrative view of an alternate embodiment of an injector 109 that isolates inactive fluid passages. The fuel injector 109 includes a first fluid duct 103 having a first fuel inlet 108 and a second fluid duct 105 having a second fuel inlet 110. A compressed air source flows compressed air simultaneously in each of the first fluid duct 103 and the second fluid duct 105. The exemplary injector 109 includes a third fluid duct 107 having a third active fuel inlet 212, where the compressed air source flows compressed air simultaneously in each of the first fluid duct 103 (at 102), the second fluid duct 105 (at 104), and the third fluid duct 107 (at 206). The fuel inlets 108, 110, 212 may alternatively be inlets for any active fluid. The compressed air source may alternatively include one or more carrier fluid sources, and the compressed air may alternatively be one or more of any carrier fluid. The injector 109 includes three combined streams 116, 118, 222 that combine at a convergence point 106.

The first combined stream 116 includes the compressed air 102 mixed with a first fuel, the second combined stream 118 includes the compressed air 104 mixed with a second fuel, and the third combined stream 222 includes the compressed aft 206 combined with the third fuel. The fuel sources are structured in a parallel flow arrangement. An exemplary parallel flow arrangement includes each fuel source positioned at a flow location upstream of any fluid mixing point between the fluid ducts 108, 110, 212.

In another exemplary embodiment, the parallel flow arrangement includes each active fuel source positioned at a flow location that is an additional distance upstream of any fluid mixing point between the fluid ducts 108, 110, 212 such that any localized flow reversal will not provide mixed fluid at any active fluid source. For example, the first fluid duct 108 is positioned the distance 114 upstream of the mixing location for the combined streams 116, 118, the second fluid duct 110 is positioned at least the distance 112 upstream of the mixing location for the combined streams 116, 118, 222, and the third fluid duct 212 is positioned at least the distance 214 upstream of the mixing location for the combined streams 116, 118, 222. Localized flow reversals include Coanda effect flow, fluid duct pressure differential flow, and/or idle active fuel source reverse flow. FIG. 3 illustrates an injector 109 structured for three active fluid inlets 108, 110, 212, but any number of active fluid inlets are contemplated herein, including two active fluid inlets, or more than three active fluid inlets.

Figure 4:
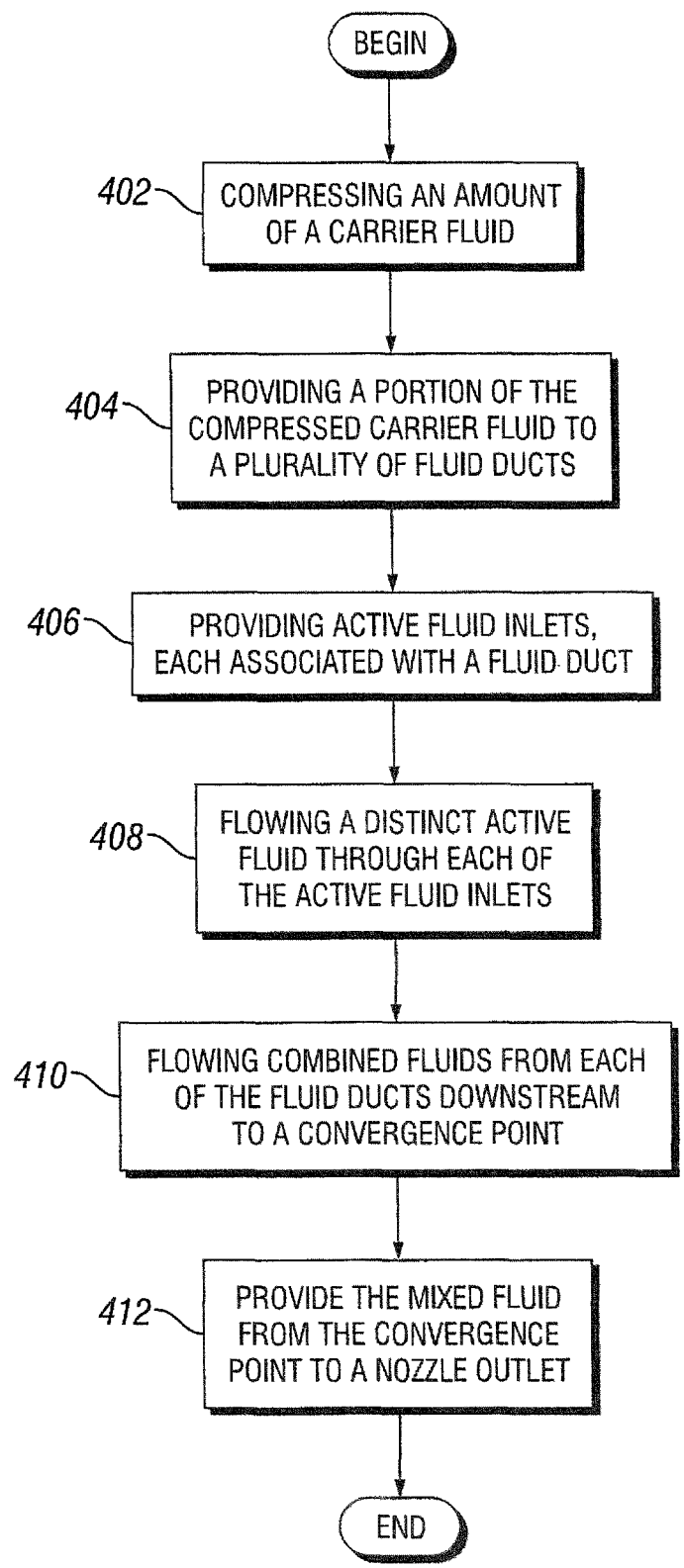
FIG. 4 is a schematic flow diagram of a procedure for isolating inactive fluid passages.

FIG. 4 is a schematic flow diagram of a procedure for isolating inactive fluid passages. The exemplary procedure includes an operation 402 to compress an amount of a carrier fluid, an operation 404 to provide a portion of the compressed carrier fluid to a plurality of fluid ducts, and an operation 406 to provide plurality of active fluid inlets, each associated with one of the fluid ducts. The procedure further includes an operation 408 to flow a distinct active fluid through each of the active fluid inlets, and an operation 410 to flow combined fluids from each of the of fluid ducts downstream to a convergence point. The procedure further includes an operation 412 to provide the mixed fluid from the convergence point to a nozzle outlet. In certain embodiments, the procedure includes an operation (not shown) to flow a first active fluid through a first active fluid inlet during a time where a second active fluid is not flowing through a second active fluid inlet. The procedure additionally or alternatively includes an operation (not shown) to provide the active fluid inlets such that any localized flow reversal within the fluid ducts will not provide mixed fluid at any active fluid inlet.

As is evident from the figures and text presented above, a variety of embodiments according to the present invention are contemplated. In one form of the present application there is provided a fluid injector that minimizes or prevents active fluids from one injector duct from entering an active fluid inlet in another injector duct. In another form of the present application, a system is provided for preventing fuel from one fuel injector duct from entering a fuel inlet in another fuel injector duct. In another form of the present application, a procedure provides operations to prevent active fluids from one injector duct entering an active fluid inlet in another injector duct.

A fluid injector includes a first fluid duct having a first active fluid inlet and a second fluid duct having a second active fluid inlet. A carrier fluid source is structured to flow a carrier fluid simultaneously into each of the first fluid duct and the second fluid duct. The injector includes a convergence point that receives a first combined stream and a second combined stream, where the first combined stream includes the carrier fluid mixed with a first active fluid, and the second combined stream includes the carrier fluid mixed with a second active fluid. The first active fluid inlet and the second active fluid inlet are structured in a parallel flow arrangement. In one embodiment, the first active fluid includes a first fuel and the second active fluid includes a second fuel. In certain embodiments, the active fluids include fuel, paint, primer, fluid chemical, and/or water.

The exemplary injector includes a third fluid duct having a third active fluid inlet, and wherein the carrier fluid source is further structured to flow the carrier fluid simultaneously in each of the first fluid duct, the second fluid duct, and the third fluid duct, and further includes a third combined stream including the carrier fluid mixed with a third active fluid. The convergence point further receives the first combined stream, the second combined stream, and the third combined stream.

The parallel flow arrangement includes each active fluid inlet positioned at a flow location upstream of any fluid mixing point. In a further embodiment, the parallel flow arrangement includes each active fluid inlet positioned at a flow location that is an additional distance upstream of any fluid mixing point such that any localized flow reversal will not provide mixed fluid at any active fluid inlet. The localized flow reversal includes Coanda effect flow, fluid duct pressure differential flow, and/or idle active fluid source reverse flow. The carrier fluid includes air, nitrogen, argon, an inert gas, water, and a solvent.

Another exemplary embodiment is a fuel injector including a first fluid duct having a first fuel inlet and a second fluid duct having a second fuel inlet. A compressed air source flows compressed air simultaneously in each of the first fluid duct and the second fluid duct. A convergence point receives a first combined stream and a second combined stream, where the first combined stream includes the compressed air mixed with a first fuel and the second combined stream includes the compressed air mixed with a second fuel. The first fuel source and the second fuel source are structured in a parallel flow arrangement. In an exemplary embodiment, the parallel flow arrangement includes each fuel source positioned at a flow location upstream of any fluid mixing point between the first fluid duct and second fluid duct. In another exemplary embodiment, the parallel flow arrangement includes each active fuel source positioned at a flow location that is an additional distance upstream of any fluid mixing point between the first fluid duct and second fluid duct such that any localized flow reversal will not provide mixed fluid at any active fuel source. The localized flow reversal includes Coanda effect flow, fluid duct pressure differential flow, and/or idle active fuel source reverse flow.

Yet another exemplary embodiment is a system including a gas turbine engine having a fuel injector. The fuel injector includes fluid ducts, where each fluid duct is coupled to an associated fuel inlet and where each associated fuel inlet is coupled to a distinct fuel source. The gas turbine engine includes a compressed air source that provides compressed air simultaneously in each of the fluid ducts. The fuel injector includes a convergence point that receives combined streams from each of the fluid ducts, where each combined stream includes compressed air and fuel from the associated fuel inlet. The associated fuel inlets are structured in a parallel flow arrangement. The parallel flow arrangement includes each associated fuel inlet positioned at a flow location upstream of any fluid mixing point between each of the plurality of fluid ducts. The parallel flow arrangement further includes, in an exemplary embodiment, each associated fuel inlet positioned at a flow location that is an additional distance upstream of any fluid mixing point between each of the plurality of fluid ducts such that any localized flow reversal will not provide mixed fluid at any associated fuel inlet. The localized flow reversal includes a Coanda effect flow, a fluid duct pressure differential flow, and/or an idle associated fuel inlet reverse flow.

Yet another exemplary embodiment is a method, comprising compressing an amount of a carrier fluid, providing a portion of the compressed carrier fluid to a plurality of fluid ducts, providing a plurality of active fluid inlets, each associated with one of the plurality of fluid ducts, flowing a distinct active fluid through each of the plurality of active fluid inlets, flowing combined fluids from each of the plurality of fluid ducts downstream to a convergence point, and providing the mixed fluid from the convergence point to a nozzle outlet. The exemplary method further includes flowing a first active fluid through a first active fluid inlet during a time where a second active fluid is not flowing through a second active fluid inlet. The method further includes providing the active fluid inlets such that any localized flow reversal within the plurality of fluid ducts will not provide mixed fluid at any active fluid inlet.

While the invention has been illustrated and described in detail in the drawings and foregoing description, the same is to be considered as illustrative and not restrictive in character, it being understood that only certain embodiments have been shown and described and that all changes and modifications that come within the spirit of the inventions are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A fluid injector, comprising:
a first fluid duct having a first active fluid inlet and a second fluid duct having a second active fluid inlet and a third fluid duct having a third active fluid inlet;
a carrier fluid source structured to flow a carrier fluid simultaneously in each of the first fluid duct, the second fluid duct, and the third fluid duct;
a first convergence point that receives a first combined stream, a second combined stream, and a third combined stream, the first combined stream comprising the carrier fluid mixed with a first active fluid entering the first fluid duct through the first active duct inlet, the second combined stream comprising the carrier fluid mixed with a second active fluid entering the second fluid duct through the second active duct inlet, and the third combined stream comprising the carrier fluid mixed with a third active fluid entering the third fluid duct through the third active duct inlet;
a second convergence point that receives the second combined stream and the third combined stream, the second convergence point being located upstream of the first convergence point; and
wherein the first active fluid inlet and the second active fluid inlet are structured in a parallel flow arrangement;
wherein the parallel flow arrangement comprises the first active fluid inlet and the second active fluid inlet positioned at a flow location that is predetermined additional distance upstream of a fluid mixing point between the first combined stream and second combined stream, the predetermined additional distance selected to provide that any localized flow reversal present in the first combined stream, the second combined stream, or the third combined stream will not suffice to provide mixed fluid at the first active fluid inlet and the second active fluid inlet,
wherein the first fluid duct has a first perimeter wall and the second fluid duct has a second perimeter wall;
wherein the first active fluid inlet is coupled to the first perimeter wall and structured to open into the first perimeter wall at an inclined angle relative to the first perimeter wall to deliver an active fluid through the first perimeter wall and into the first fluid duct and is positioned upstream from the downstream-most end of the first perimeter wall of the first fluid duct; and
wherein the second active fluid inlet is coupled to the second perimeter wall and structured to open into the second perimeter wall at an inclined angle relative to the second perimeter wall to deliver an active fluid through the second perimeter wall and into the second fluid duct and is positioned upstream from the downstream-most end of the second perimeter wall of the second fluid duct.

2. The fluid injector of claim 1, wherein the first active fluid comprises a first fuel and the second active fluid comprises a second fuel.

3. The fluid injector of claim 1, wherein each active fluid of the first active fluid, the second active fluid, and the third active fluid comprises a fluid selected from fluids consisting of: fuel, paint, primer, fluid chemical, solvent, and water.

4. The fluid injector of claim 1, wherein the localized flow reversal comprises at least one flow selected from flows consisting of: Coanda effect flow, fluid duct pressure differential flow, and idle active source reverse flow.

5. The fluid injector of claim 1, wherein the carrier fluid comprises a fluid selected from fluids consisting of: air, nitrogen, argon, an inert gas, water, and a solvent.

6. A fuel injector, comprising:
a first fluid duct having a first fuel inlet, a second fluid duct having a second fuel inlet, and a third fluid duct having a third fuel inlet;
a compressed air source structured to flow compressed air simultaneously in each of the first fluid duct, second fluid duct, and third fluid duct;
a first convergence point receiving a first combined stream, a second combined stream, and a third combined stream, the first combined stream comprising the compressed air mixed with a first fuel entering the first fluid duct through the first fuel inlet, the second combined stream comprising the compressed air mixed with a second fuel entering the second fluid duct through the second fuel inlet, and the third combined stream comprising the compressed air mixed with a third fuel entering the third fluid duct through the third fuel inlet;
a second convergence point that receives the second combined stream and the third combined stream, the second convergence point being located upstream of the first convergence point; and
wherein the first fuel inlet, the second fuel inlet, and the third fuel inlet are structured in a parallel flow arrangement;
wherein the first fluid duct has a first perimeter wall and the second fluid duct has a second perimeter wall;
wherein the first fuel inlet is coupled to the first perimeter wall and structured to open into the first perimeter wall at an inclined angle relative to the first perimeter wall to deliver the first fuel through the first perimeter wall and into the first fluid duct and is positioned upstream from the downstream-most end of the first perimeter wall of the first fluid duct; and
wherein the second fuel inlet is coupled to the second perimeter wall and structured to open into the second perimeter wall at an inclined angle relative to the second perimeter wall to deliver the second fuel through the second perimeter wall and into the second fluid duct and is positioned upstream from the downstream-most end of the second perimeter wall of the second fluid duct.

7. The fuel injector of claim 6, wherein the parallel flow arrangement comprises the first fuel inlet and the second fuel inlet positioned at a flow location upstream of any fluid mixing point between the first combined stream and the second combined stream.

8. The fuel injector of claim 7, wherein the parallel flow arrangement comprises the first fuel inlet and the second fuel inlet positioned at a flow location that is a predetermined additional distance upstream of any fluid mixing point between the first combined stream and the second combined stream and the predetermined additional distance is selected to provide that any localized flow reversal present in the first combined stream, the second combined stream, or the third combined stream will not suffice to provide mixed fluid at the first fuel inlet and the second fuel inlet.

9. The fuel injector of claim 8, wherein the localized flow reversal comprises at least one flow selected from flows consisting of: Coanda effect flow, fluid duct pressure differential flow, and idle fuel source reverse flow.

10. A system, comprising:
a turbine engine having a fuel injector, comprising: a plurality of fluid ducts including at least three fluid ducts, each of the plurality of fluid ducts coupled to an associated fuel inlet of a plurality of fuel inlets wherein each of the associated fuel inlet is coupled to a distinct fuel source;
a compressed air source that provides compressed air simultaneously in each of the plurality of fluid ducts;
a first convergence point receiving a plurality of combined streams from each of the plurality of fluid ducts, each of the combined stream of the plurality of combined streams comprising compressed air and a fuel from the distinct fuel source entering the plurality of fluid ducts through the associated fuel inlet;
a second convergence point receiving the combined streams of two of the at least three fluid ducts, the second convergence point being located upstream of the first convergence point; and
wherein a first fuel inlet of the plurality of fuel inlets associated with a first fluid duct of the at least three fluid ducts and a second fuel inlet of the plurality of fuel inlets associated with a second fluid duct of the at least three ducts are structured in a parallel flow arrangement;
wherein the first fluid duct has a first perimeter wall and the second fluid duct has a second perimeter wall;
wherein the first fuel inlet is coupled to the first perimeter wall and structured to open into the first perimeter wall at an inclined angle relative to the first perimeter wall to deliver fuel from the distinct fuel source entering the first fluid duct through the first fuel inlet and is positioned upstream from the downstream-most end of the first perimeter wall of the first fluid duct; and
wherein the second fuel inlet is coupled to the second perimeter wall and structured to open into the second perimeter wall at an inclined angle relative to the second perimeter wall to deliver fuel from the distinct fuel source entering the second fluid duct through the second fuel inlet and is positioned upstream from the downstream-most end of the second perimeter wall of the second fluid duct.

11. The system of claim 10, wherein the parallel flow arrangement comprises each of the first fuel inlet and the second fuel inlet positioned at a flow location that is a predetermined additional distance upstream of the second convergence point and the predetermined additional distance is selected to provide that any localized flow reversal present in the plurality of combined streams will not suffice to provide mixed fluid at the first fuel inlet and the second fuel inlet.

\* \* \* \* \*